United States Patent [19]

Bankert

[11] 4,380,603
[45] Apr. 19, 1983

[54] EPIHALOHYDRIN MODIFIED DICYANDIAMIDE-FORMALDEHYDE CONDENSATES AND PROCESS FOR PREPARING THE SAME

[75] Inventor: Ralph A. Bankert, New Castle, Del.

[73] Assignee: Hercules Incorporated, Wilmington, Del.

[21] Appl. No.: 328,754

[22] Filed: Dec. 8, 1981

[51] Int. Cl.$^3$ .............................................. C08L 61/22
[52] U.S. Cl. ................................. 524/598; 162/164.3; 524/843; 528/250; 528/268
[58] Field of Search .............................. 524/843, 598; 162/164.3; 258/250, 268, 243

[56] References Cited

U.S. PATENT DOCUMENTS

| | | | |
|---|---|---|---|
| 2,973,239 | 2/1961 | Gortvai | 8/74 |
| 3,594,272 | 7/1971 | Shen et al. | 162/167 |
| 3,840,486 | 10/1974 | Dumas | 260/29.4 |
| 3,914,155 | 10/1975 | Horowitz | 162/167 |
| 3,951,921 | 4/1976 | Espy et al. | 260/78 |

FOREIGN PATENT DOCUMENTS 588990  3/1945  United Kingdom .

*Primary Examiner*—Theodore E. Pertilla
*Attorney, Agent, or Firm*—Hazel L. Deming

[57] ABSTRACT

Disclosed are novel water-soluble, thermosettable resinous compositions derived by reacting a precondensate of dicyandiamide, formaldehyde, a salt of a water-soluble polyaminopolyamide and an ammonium salt with epihalohydrin, condensing the reaction product with additional formaldehyde and then post-modifying the condensate with additional epihalohydrin or a nitrogen-containing compound. The resinous compositions are cationic and have particular utility in the manufacture of paper sized with cellulose reactive sizing agents such as ketene dimer sizing agents.

13 Claims, No Drawings

EPIHALOHYDRIN MODIFIED DICYANDIAMIDE-FORMALDEHYDE CONDENSATES AND PROCESS FOR PREPARING THE SAME

This invention relates to novel water-soluble, thermosettable resinous compositions containing dicyandiamide-formaldehyde condensates and more particularly relates to the compositions produced by reacting a precondensate of dicyandiamide, formaldehyde, an acid salt of a water-soluble polyaminopolyamide and an ammonium salt with epihalohydrin, condensing the reaction product with formaldehyde and then reacting the resulting condensate with additional epihalohydrin or a nitrogen-containing compound. The resinous compositions are cationic and water-soluble and have particular utility in the manufacture of sized paper wherein the sizing agent employed is a cellulose reactive sizing agent such as a ketene dimer sizing agent.

In U.S. Pat. No. 3,840,486, Dumas describes water-soluble, cationic, thermosettable resinous compositions derived from dicyandiamide, an ammonium salt, formaldehyde and an acid salt of a water-soluble polyaminopolyamide and teaches their preparation by forming a precondensate by heat reacting in aqueous medium 1 mole of dicyandiamide, from 0.75 to 1.5 moles of formaldehyde, sufficient of an acid salt of a polyaminopolyamide to provide about 0.125 to about 0.5 equivalent of basic nitrogen and an ammonium salt in an amount to provide a total of from 0.8 to about 1.2 equivalents of basic nitrogen until substantially all nitriles of the dicyandiamide have reacted, adding from about 1.25 to about 3.75 moles of formaldehyde to the aqueous precondensate and refluxing the resulting mixture until the viscosity of a solution of the product is within a desired range. The resinous compositions of U.S. Pat. No. 3,840,486 are said to be useful as accelerators for hydrophobic cellulose reactive sizing agents and the combination is reported to provide higher off-the-machine sizing than is provided by an equivalent amount of the sizing agent alone. Dumas' resinous compositions, however, do not impart sizing to paper when used alone in amounts normally employed in the paper sizing art and the use of Dumas' resinous compositions in combination with cellulose reactive sizes as sizing agents in the manufacture of paper does not provide an ultimate degree of sizing which is substantially different from that achieved with the sizing agent alone. Since nearly all grades of paper are sized to some extent, increased sizing efficiency is an important objective of papermakers and any improvements which can be realized in the degree of sizing can have pronounced economic significance.

Now, in accordance with this invention, it has been found that unique resins are produced by modifying the process of U.S. Pat. No. 3,840,486 and that the modified resins so produced provide higher ultimate sizing with cellulose reactive sizing agents such as ketene dimers, acid anhydrides and isocyanates on natural aging or oven curing as compared with the unmodified resins. Further, the resins produced in accordance with this invention accelerate the rate of sizing development with cellulose reactive sizing agents and thus increase the overall efficiency of the sizing agents.

Accordingly, the present invention relates to a process for preparing improved water-soluble thermosettable resinous compositions containing dicyandiamide-formaldehyde condensates, which process comprises (1) forming a precondensate solution by refluxing for about 1 to about 4 hours an aqueous mixture of (a) a base reaction product of 1 mole of dicyandiamide, 0.75 mole to 1.5 moles of formaldehyde and an acid salt of a water-soluble polyaminopolyamide in an amount sufficient to provide from about 0.125 to about 0.5 equivalent of basic nitrogen and (b) an ammonium salt in an amount such that there will be from 0.7 equivalent to about 1.2 equivalents of basic nitrogen derived from the salt of the polyaminopolyamide and the ammonium salt in the aqueous medium, (2) adding to the precondensate solution from 0.30 to 0.45 mole of epihalohydrin per equivalent of basic nitrogen derived from the salt of the polyaminopolyamide and the ammonium salt, and heating the aqueous mixture at about 50° to about 80° C. for about 15 to about 45 minutes until a solution of modified precondensate is formed, (3) adding from about 1.25 to about 3.75 moles of formaldehyde to the aqueous solution of modified precondensate and heating the resulting mixture at about 60° to about 100° C. until the viscosity of an aqueous solution of the resulting reaction product at a solids content of 50% is from about U to Z on the Gardner-Holdt scale, (4) diluting the solution of step (3), if necessary, to a solids content less than 35% and (5) adding to the solution of step (4) from 0.03 to 0.75 mole, per mole of formaldehyde added in step (3), of epihalohydrin or a nitrogen-containing compound of the formula NHRR' where R and R' are independently hydrogen, alkyl or hydroxyalkyl and when R is hydrogen, R' also is aminoalkyl or an amido group, and heating the resulting mixture at about 45° to about 70° C. for about 0.5 hour to about 2 hours, and to the resinous compositions so produced.

As above set forth, dicyandiamide is one of the reactants employed in preparing the precondensate in the first step of the process of this invention. Dicyandiamide is also known as cyanoguanidine and has the following structure:

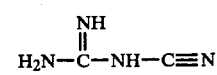

Formaldehyde is another reactant employed to prepare the precondensate. As employed in this specification and in the claims, formaldehyde includes formaldehyde in the form of 30–40% aqueous solutions and polymeric forms of formaldehyde such as, for example, paraformaldehyde, trioxane, and hexamethylenetetramine. Chemical compounds such as acetals which will liberate formaldehyde on heating can be employed as a source of formaldehyde if desired.

The ammonium salt reactant is a water-soluble salt of an amine and an acid. Particularly suitable salts are those having the formula $(NH_4)_mX$; $(R_1NH_3)_mX$; or $(R_1R_2NH_2)_mX$ where $R_1$ and $R_2$ are alkyl radicals having from 1 through 4 carbon atoms such as methyl, ethyl, propyl, isopropyl and n-butyl; X is the acid anion such, for example, as $Cl^-$, $Br^-$, $I^-$, $SO_4^=$, $CH_3COO^-$, $NO_3^-$, and $PO_4^\equiv$; and m is an integer equal to the anion charge. Specific examples of suitable ammonium salts include ammonium sulfate, ammonium chloride, methyl ammonium chloride, dimethyl ammonium chloride, ethyl ammonium sulfate, and ammonium acetate.

Other suitable ammonium salts are the water-soluble salts of (1) a polyamine having the structure

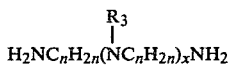

where $R_3$ is hydrogen or methyl; n is an integer 2 through 6; and x is an integer 0 through 3 and (2) an acid such as sulfuric acid, hydrochloric acid, hydrobromic acid, hydroiodic acid, nitric acid, phosphoric acid and acetic acid. Specific examples of polyamines are ethylene diamine, propylene diamine, hexamethylene diamine, diethylenetriamine, tetraethylenepentamine, and bis(3-aminopropyl)amine.

Another reactant is an acid salt of a water-soluble polyaminopolyamide. The polyaminopolyamide is derived by reaction of a dicarboxylic acid and a polyalkylenepolyamine in a mole ratio of polyalkylenepolyamine to dicarboxylic acid of from about 0.8:1 to about 1.4:1. Particularly suitable dicarboxylic acids are diglycolic acid and saturated aliphatic dicarboxylic acids containing from 3 through 10 carbon atoms such as malonic acid, succinic acid, glutaric acid, adipic acid, pimelic acid, suberic acid, azelaic acid and sebacic acid. Other suitable dicarboxylic acids include terephthalic acid, isophthalic acid, phthalic acid and alpha-unsaturated dicarboxylic acids such as maleic acid, fumaric acid, itaconic acid, glutaconic acid, citraconic acid and mesaconic acid. The available anhydrides of the above acids can be used for preparing the water-soluble polyaminopolyamide as well as the esters of the acids. Mixtures of two or more of the above acid moieties can be employed if desired.

A number of polyalkylenepolyamines, including polyethylenepolyamines, polypropylenepolyamines, polybutylenepolyamines and the like can be employed to produce the polyaminopolyamide. The polyalkylenepolyamine employed will have two primary amine groups and can be represented as polyamines in which the nitrogen atoms are linked together by groups of the formula —$C_nH_{2n}$— where n is a small integer greater than unity and preferably 2 through 6, and the number of such groups in the molecule ranges from two up to about eight. The nitrogen atoms can be attached to adjacent carbon atoms in the group —$C_nH_{2n}$— or to carbon atoms farther apart, but not to the same carbon atoms. Polyamines such as diethylenetriamine, triethylenetetramine, tetraethylenepentamine, and bis(3-aminopropyl)amine, which can be obtained in reasonably pure form are suitable for preparing water-soluble polyaminopolyamides. Other polyalkylenepolyamines that can be used include methyl bis(3-aminopropyl)amine; methyl bis(2-aminoethyl) amine; and 4,7-dimethyltriethylenetetramine. Mixtures of polyalkylenepolyamines can be used, if desired.

The above polyalkylenepolyamines can be represented by the formula

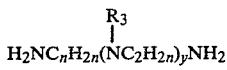

where $R_3$ is hydrogen or methyl; n is an integer 2 through 6, as above set forth, and y is an integer 1 through 3. Other polyalkylenepolyamines that can be employed and which are not included in the above formula include 1,4-bis(3-aminopropyl)piperazine and 1-(2-aminoethyl)piperazine.

The spacing of an amino group on the polyaminopolyamide can be increased if desired. This can be accomplished by substituting a diamine such as ethylenediamine, propylenediamine, hexamethylenediamine and the like for a portion of the polyalkylenepolyamine. For this purpose, up to about 80% of the polyalkylenepolyamine can be replaced by a molecularly equivalent amount of diamine. Usually, a replacement of about 50% or less will be adequate.

Temperatures employed for carrying out the reaction between the dicarboxylic acid and the polyalkylenepolyamine to form the water-soluble polyaminopolyamide can vary from about 110° C. to about 250° C. or higher at atmospheric pressure. For most purposes, temperatures between about 160° C. and 210° C. are preferred. The time of reaction will vary inversely with reaction temperatures employed and usually will be from ½ to 2 hours. The reaction is desirably continued to substantial completion, as determined by the amount of water evolved. In carrying out the reaction, it is preferred to use an amount of dicarboxylic acid sufficient to react substantially completely with the primary amine groups of the polyalkylenepolyamine but insufficient to react with the secondary amine groups and/or tertiary amine groups to any substantial extent. This will usually require a mole ratio of polyalkylenepolyamine to dicarboxylic acid of from about 0.9:1 to about 1.2:1. However, mole ratios of from about 0.8:1 to about 1.4:1 can be used.

The following example is illustrative of the preparation of a suitable water-soluble polyaminopolyamide for use as its salt in the preparation of the precondensate.

EXAMPLE A

A water-soluble polyaminopolyamide for use as its acid salt was formed by adding 146 parts (weight) of adipic acid slowly, with stirring, to 100 parts (weight) of diethylenetriamine in a reaction vessel equipped with a stirrer, thermometer and a condenser for collecting water distillate. The reaction mixture was stirred and heated at a temperature of from about 170° C. to 175° C. until amide formation was complete. After air cooling to approximately 140° C., hot water was added with stirring to provide about a 50% solids solution of polyaminopolyamide resin having an intrinsic viscosity of 0.14 measured on a 2% solution in aqueous 1 M $NH_4Cl$ at 25° C.

The preferred procedure for use in forming the precondensate as set forth in the first step of the process of this invention is described below.

Into a reaction vessel are placed about one mole of dicyandiamide (cyanoguanidine), from about ¾ mole to about 1½ moles of formaldehyde, water-soluble polyaminopolyamide in an amount sufficient to provide from about ⅛ to about ½ of an equivalent of basic nitrogen (as distinguished from the amide nitrogens of the polyaminopolyamide), and an acid in an amount equivalent to the amount of the basic nitrogen of the polyaminopolyamide. Suitable acids include sulfuric acid, hydrochloric acid, phosphoric acid, nitric acid, acetic acid, hydrobromic acid and hydroiodic acid. Water is conveniently employed as the reaction medium and sufficient water should be present in the mixture to provide an aqueous reaction mass that can be easily agitated (as by stirring) under reaction conditions. The amount of water employed is well within the skill of one versed in the art having before him the teachings of this invention. The acid forms the polyaminopolyamide acid salt reactant.

The aqueous mixture is subsequently heated to reflux temperature (about 95° C.–105° C.) and refluxed for a period of time of about 15 minutes to about 30 minutes (or longer, if desired). Subsequently, the ammonium salt is added in an amount such that there will be from about 0.7 equivalent to about 1.2 equivalents (preferably about 1 equivalent) of basic nitrogen derived from the salt of the polyaminopolyamide and the ammonium salt present in the reaction mixture. Thus, for example, when the polyaminopolyamide is employed in an amount equal to ½ (0.5) equivalent of basic nitrogen, the amount of ammonium salt employed will be such as to provide from about 0.2 equivalent to about 0.7 equivalent of basic nitrogen. The resulting mixture is heated to reflux and maintained at reflux temperature for about 1 to about 4 hours. Somewhat shorter periods of time can be used if the heating is carried out under moderate pressure.

In the second step of the process of this invention, there is added to the precondensate solution from 0.30 to 0.45 mole and preferably from 0.35 to 0.40 mole of epihalohydrin per equivalent of basic nitrogen derived from the salt of the polyaminopolyamide and the ammonium salt. The resulting mixture is then heated to about 50° to about 80° C. and maintained at about 50° to about 80° C. until a solution of modified precondensate is formed. This will usually require a period of time from about 15 minutes to about 45 minutes.

In the third step of the process of this invention, there are added to the modified precondensate from about 1.25 to about 3.75 moles of formaldehyde and the resulting mixture is then heated to between about 60° and about 100° C. and maintained thereat until the viscosity of an aqueous solution of the resinous reaction product, when measured at a solids content of 50% at 25° C. is from about U to Z and preferably from about V to W, on the Gardner-Holdt scale. This will usually require a period of time of from about 20 minutes to about 3 hours.

In step (4) and (5) the aqueous solution is then diluted, as necessary, with water to a solids content of less than 35% and there is added to the solution (at a solids content of less than 35%) from 0.03 to 0.75 mole and preferably from 0.05 to 0.60 mole, per mole of formaldehyde added in step (3), of epihalohydrin or a nitrogen-containing compound of the formula NHRR', where R and R' are independently hydrogen, alkyl or hydroxyalkyl and, when R is hydrogen, R' is also aminoalkyl or an amido group, heating the mixture to about 45° to about 70° C. and maintaining thereat for about 0.5 hour to about 2 hours. The preferred nitrogen-containing compounds which can be used in step (5) include ammonia, mono- or dialkyl-amines and particularly alkylamines wherein the alkyl group(s) contain(s) 1 to 4 carbon atoms, the mono- or di-alkanolamines, the alkylene diamines and urea. Particularly preferred compounds for the post-modification step (5) are epichlorohydrin, ammonia, dimethylamine, diethanolamine, ethylenediamine and urea. The resulting solution will usually have a solids content of less than 35% and preferably from about 15% to about 25. If the pH of the solution is outside of the range of about 6 to about 7.5, acid or base, as required, is preferably added to adjust the pH to between about 6.0 and about 7.5 to provide storage stability.

The best mode now contemplated for carrying out this invention is illustrated by the following examples of specific embodiments thereof and the invention is not limited to the specific embodiments. All percentages are by weight unless otherwise specified and the Gardner-Holdt viscosity measurements were made at 25° C.

EXAMPLE 1

Part 1—Into a reaction vessel fitted with reflux condenser, mechanical stirrer and thermometer were placed the following to provide a mixture of ingredients:

| Ingredient | Grams |
| --- | --- |
| Polyaminopolyamide solution of Example A (50.6% solids) | 522 (1.24 equivalents of basic nitrogen) |
| Formaldehyde (37% aqueous solution) | 320 (3.97 moles) |
| Dicyandiamide | 269 (3.2 moles) |
| $H_2SO_4$ (98%) | 65.5 (.66 moles) |

Sulfuric acid was added last and was added dropwise. During addition of the sulfuric acid the temperature of the mixture increased to about 40°–45° C. The mixture was then heated to a temperature of about 100° C. and refluxed for about 15 minutes. Following cooling of the mixture to 85° C., 137.5 grams (1.04 moles) of ammonium sulfate were added and the mixture was heated at 100° C. for about 3 hours. The resulting solution of precondensate weighed 1300 grams and contained 62.5% solids.

Part 2—Into a reaction vessel equipped with a mechanical stirrer, thermometer and reflux condenser were placed 272.4 grams of the precondensate solution of Part 1 and 24 grams (0.26 mole) of epichlorohydrin. The mixture was heated at a temperature of 70° C. for about 30 minutes and then 136 grams (1.68 moles) of 37% aqueous formaldehyde solution were added over a period of 5 minutes. The mixture was heated at 100° C. until the Gardner-Holdt viscosity of the aqueous solution of the resinous reaction product was W. Water, 300 ml, and then 19.4 grams (0.21 mole) of epichlorohydrin were added to the reaction vessel and the mixture was heated at 70° C. for 30 minutes. The resulting solution was cooled to room temperature and diluted with 300 ml of water. The pH of the aqueous solution of the resinous reaction product was adjusted to 7.0 by adding thereto 25.4 ml of a 25% aqueous solution of sodium hydroxide. Total solids was 22.1% and the Gardner-Holdt viscosity of the aqueous solution was A-2.

EXAMPLE 2

Part 1—The procedure of Example 1, Part 1 was repeated and gave 1295 grams of a precondensate containing 64% solids.

Part 2—Into a reaction vessel fitted with reflux condenser, mechanical stirrer and thermometer were placed 133 grams of the 64% solids precondensate solution of Part 1 and 12 grams (0.13 mole) of epichlorohydrin. The mixture was heated at a temperature of about 70° C. for about 30 minutes. There were then added to the reaction vessel 68 grams (0.84 mole) of 37% aqueous formaldehyde solution over a period of 5 minutes and the mixture was heated and maintained at 100° C. until the Gardner-Holdt viscosity of the resinous reaction product was W+. Water, 110 ml, was added to the reaction vessel, the contents thereof cooled to 50° C., 22.1 grams (0.21 mole) of diethanolamine were added and the mixture was maintained at 50° C. for 2 hours. The solution was next cooled to room temperature and diluted with 200 ml of water. The pH of the solution was 7.2. Total solids of the aqueous solution was 21.2% and the Gardner-Holdt viscosity of the aqueous solution was A-1+.

EXAMPLE 3

Into a reaction vessel fitted with reflux condenser, mechanical stirrer and thermometer were placed 133 grams of the 64% solids precondensate solution of Example 2, Part 1 and 12 grams (0.13 mole) of epichlorohydrin. The mixture was heated at a temperature of 70° C. for 30 minutes, following which time 68 grams (0.84 mole) of 37% aqueous formaldehyde were added over a 5 minute period. The mixture was heated to 100° C. and maintained at that temperature until the Gardner-Holdt viscosity was W−. Water, 150 ml, was added to the vessel, the contents were cooled to 50° C., 23.6 grams (0.21 mole) of 40% aqueous dimethylamine solution were added and the mixture was maintained at 50° C. for 2 hours. The resulting solution was cooled to room temperature and diluted with 200 ml of water. The diluted solution had a pH of 7.1, a solids content of 19.5% and a Gardner-Holdt viscosity of A-1+.

EXAMPLE 4

The procedure of Example 3 was repeated except that the reaction mixture was heated at 100° C. until the Gardner-Holdt viscosity was X+, 12.1 grams (0.21 mole) of 29.4% aqueous ammonium hydroxide were substituted for the 23.6 grams of the dimethylamine solution, the mixture was heated at 50° C. for 1 hour and the diluted solution was adjusted to a pH of 6.9 with 5.7 ml of 25% aqueous sodium hydroxide. The resulting solution had a solids content of 18.7% and a Gardner-Holdt viscosity of A-1+.

EXAMPLE 5

Part 1—The procedure of Example 1, Part 1 was repeated and gave 1291 grams of a precondensate solution having a solids content of 62.1%.

Part 2—The procedure of Example 3 was repeated except that 137.1 grams of the precondensate solution of Part 1 of this example were substituted for the precondensate solution of Example 2, Part 1, the reaction mixture was heated at 100° C. until the Gardner-Holdt viscosity was W+, 24.3 grams (0.42 mole) of 29.4% aqueous ammonium hydroxide were substituted for the dimethylamine solution, the mixture was heated at 50° C. for 1 hour and the cooled solution was diluted with 150 ml of water. The diluted solution had a pH of 7.0, a solids content of 21.5% and a Gardner-Holdt viscosity of A-1+.

EXAMPLE 6

The procedure of Example 5, Part 2 was repeated except that 12.6 grams (0.21 mole) of urea dissolved in 25 ml of water were substituted for the ammonium hydroxide and added to the contents of the vessel at 60° C., the mixture was heated at 70° C. for 30 minutes and the pH of the diluted solution was adjusted to 6.9 with 11 ml of 25% aqueous sodium hydroxide. The resulting solution had a total solids of 23.3% and a Gardner-Holdt viscosity of A-1+.

The resinous reaction products produced in accordance with this invention are thermosettable and water-soluble. They have particular utility as sizing accelerators for hydrophobic cellulose reactive sizing agents such as acid anhydrides, isocyanates, and ketene dimers.

Hydrophobic acid anhydrides useful as cellulose reactive sizing agents for paper include (A) rosin anhydride (see U.S. Pat. No. 3,582,464); (B) anhydrides having the structure

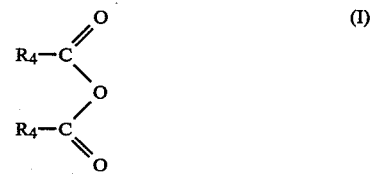

where each $R_4$ is alike or different and is a saturated or unsaturated hydrocarbon radical containing more than 7 and preferably 8 to 30 carbon atoms and is preferably selected from the group consisting of alkyl, alkenyl, aralkyl, aralkenyl and alkaryl radicals, and (C) cyclic dicarboxylic acid anhydrides having the structure:

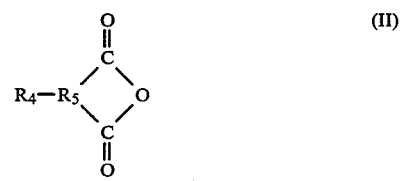

where $R_4$ is as above defined and $R_5$ represents a dimethylene or trimethylene radical. Specific examples of anhydrides of formula (I) are myristoyl anhydride, palmitoyl anhydride, oleoyl anhydride, and stearoyl anhydride. Substituted cyclic dicarboxylic acid anhydrides falling within the above formula (II) are substituted succinic and glutaric anhydrides such as isooctadecenyl succinic acid anhydride; n-hexadecenyl succinic acid anhydride, dodecyl succinic acid anhydride, decenyl succinic acid anhydride, octenyl succinic acid anhydride, and heptyl glutaric acid anhydride.

Isocyanates that can be used as cellulose reactive sizing agents include rosin isocyanate and isocyanates having the formula $R_4NCO$ where $R_4$ is as above defined. Specific examples of such isocyanates are octadecyl isocyanate, dodecyl isocyanate, tetradecyl isocyanate, hexadecyl isocyanate, eicosyl isocyanate, docosyl isocyanate and 6-phenyldecylisocyanate. Polyisocyanates such as 1,18-octadecyl diisocyanate and 1,12-dodecyl diisocyanate wherein one long chain alkyl group serves two isocyanate radicals and imparts hydrophobic properties to the molecule as a whole are also useful.

Ketene dimers used as cellulose reactive sizing agents are dimers having the formula:

where $R_6$ is a hydrocarbon radical, such as an alkyl having at least 8 carbon atoms, cycloalkyl having at least 6 carbon atoms, aryl, aralkyl or alkaryl. In naming ketene dimers, the radical "$R_6$" is named followed by "ketene dimer". Thus, phenyl ketene dimer is:

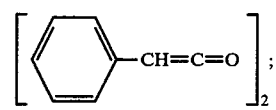

benzyl ketene dimer is:

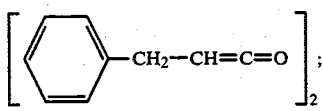

and decyl ketene dimer is: $[C_{10}H_{21}-CH=C=O]_2$. Examples of ketene dimers include octyl, decyl, dodecyl, tetradecyl, hexadecyl, octadecyl, eicosyl, docosyl, tetracosyl, phenyl, benzyl, beta-naphthyl and cyclohexyl ketene dimers, as well as the ketene dimers prepared from montanic acid, naphthenic acid, $\Delta^{9,10}$-decylenic acid, $\Delta^{9,10}$-dodecylenic acid, palmitoleic acid, oleic acid, ricinoleic acid, linoleic acid, linolenic acid, and eleostearic acid, as well as ketene dimers prepared from naturally occurring mixtures of fatty acids, such as those mixtures found in coconut oil, babassu oil, palm kernel oil, palm oil, olive oil, peanut oil, rape oil, beef tallow, lard (leaf) and whale blubber. Mixtures of any of the above-named fatty acids with each other may also be used.

The following examples illustrate the use of the novel resinous compositions produced in accordance with this invention with a known ketene dimer paper sizing agent. The ketene dimer sizing agent was in emulsion form and contained, prior to dilution, 6.0% of the ketene dimer prepared from a mixture of palmitic and stearic acids and 1.5% of cationic starch as emulsion stabilizer.

EXAMPLES 7 TO 12

Separate emulsions, each containing 0.10% of ketene dimer and 0.15% of one of the resinous reaction products of Examples 1 to 6 were prepared and evaluated in a pulp blend of 40% newsblank, 30% Rayonier bleached kraft and 30% Weyerhaeuser bleached hardwood kraft pulp beated to a Canadian standard freeness of 350 cc. The pulp was diluted to 2.55%, the emulsion was added to the dilute stock and the pH was adjusted to 8. The stock was formed into handsheets with a basis weight of 40 lb./3000 ft.$^2$ and the sheets were dried to a moisture content of 3 to 5%. Part of the sheets was given an extra cure of 5 minutes at 105° C. In each case, the amount of emulsion used provided a total of 0.25% ketene dimer plus resinous reaction product, based on dry pulp weight.

The Table below sets forth size test results on the paper sized in accordance with Examples 7 to 12 and with a control emulsion containing 0.10% ketene dimer and 0.15% of a resin produced according to the general procedure of Example 5 of U.S. Pat. No. 3,840,486, a separate control being used for each series of tests. The resin solution used for the control had a solids content of 31.4% and was obtained by heating a mixture of 133 grams of the solution of Example 2, Part 1 and 68 grams of 37% aqueous formaldehyde at 99° C. until the Gardner-Holdt viscosity was X, adding 100 ml. of 5% aqueous sodium hydroxide and cooling to room temperature. All size properties given herein were determined by use of the Hercules Sizing Tester using Test Solution No. 2 to 80% reflectance.

TABLE

| Example | Resinous Reaction Product of Example | Size Test Results in Seconds (Average of 5 Samples) | | | |
|---|---|---|---|---|---|
| | | Off Machine | Natural aging 1 day | Natural aging 7 days | Cured for 5 min. @ 105° C. |
| 7 | 1 | 3 | 118 | 170 | 350 |
| CONTROL | — | 3 | 71 | 101 | 278 |
| 8 | 2 | 2 | 112 | 192 | 256 |
| 9 | 3 | 2 | 78 | 162 | 208 |
| 10 | 4 | 3 | 83 | 192 | 295 |
| CONTROL | — | 2 | 87 | 123 | 181 |
| 11 | 5 | 3 | 47 | 78 | 304 |
| 12 | 6 | 3 | 63 | 109 | 267 |
| CONTROL | — | 4 | 43 | 66 | 114 |

The resinous compositions produced in accordance with this invention, when employed in combination with hydrophobic cellulose reactive sizing agents in the internal or surface sizing of paper, accelerate the rate at which sizing develops and provide high ultimate sizing on natural aging or oven curing. The compositions can be added either separately to the paper pulp (for internal sizing) or separately to the paper sheet (for external sizing), either before or after addition of sizing agent. Alternatively, the resinous composition and sizing agent can be added at the same time to the paper pulp or paper sheet as separate aqueous emulsions or as a single emulsion comprised of the two ingredients. The range of proportions of the sizing agent and the resinous composition can vary from about 1:3 to about 3:1 and the amount of resinous composition incorporated into the paper sheet will usually be from about 0.05% to about 0.5% (preferably from about 0.05% to about 0.25%) by weight based on the dry weight of the paper.

What I claim and desire to protect by Letters Patent is:

1. A process for preparing improved water-soluble thermosettable resinous compositions containing dicyandiamide-formaldehyde condensates which process comprises (1) forming a precondensate solution by refluxing for about 1 to about 4 hours an aqueous mixture of (a) a base reaction product of 1 mole of dicyandiamide, 0.75 mole to 1.5 moles of formaldehyde and an acid salt of a water-soluble polyaminopolyamide in an ammount sufficient to provide from about 0.125 to about 0.5 equivalent of basic nitrogen and (b) an ammonium salt in an amount such that there will be from 0.7 equivalent to about 1.2 equivalents of basic nitrogen derived from the salt of the polyaminopolyamide and the ammonium salt in the aqueous medium, (2) adding to the precondensate solution from 0.30 to 0.45 mole of epihalohydrin per equivalent of basic nitrogen derived from the salt of the polyaminopolyamide and the ammonium salt, and heating the aqueous mixture at about 50° to about 80° C. for about 15 to about 45 minutes until a solution of modified precondensate is formed, (3) adding from about 1.25 to about 3.75 moles of formaldehyde to the aqueous solution of modified precondensate and heating the resulting mixture at about 60° to about 100° C. until the viscosity of an aqueous solution of the resulting reaction product at a solids content of 50% is from about U to Z on the Gardner-Holdt scale, (4) diluting the solution of step (3), if necessary, to a solids content less than 35% and (5) adding to the solution of step (4) from 0.03 to 0.75 mole, per mole of formaldehyde added in step (3), of epihalohydrin or a nitrogen-containing compound of the formula NHRR' where R and R' are independently hydrogen, alkyl or hydroxyalkyl and, where R is hydrogen, R' also is aminoalkyl or an amido group, and heating the resulting mixture at about 45° to about 70° C. for about 0.5 hour to about 2 hours.

2. The process of claim 1 wherein the salt of the polyaminopolyamide is the sulfuric acid salt of a water-soluble polyaminopolyamide derived from adipic acid and diethylenetriamine.

3. The process of claim 2 wherein the ammonium salt is ammonium sulfate.

4. The process of claim 3 in which step (3) is carried out to a point where the viscosity of the aqueous solution at a 50% solids content is from V to W on the Gardner-Holdt scale.

5. The process of claim 4 wherein the epihalohydrin of step (2) is epichlorohydrin.

6. The process of claim 5 in which, in step (5), 0.05 to 0.6 mole of epichlorohydrin is added to the solution.

7. The process of claim 5 in which, in step (5), 0.05 to 0.6 mole of the nitrogen-containing compound is added to the solution.

8. The process of claim 7 wherein the nitrogen-containing compound is diethanolamine.

9. The process of claim 7 wherein the nitrogen-containing compound is dimethylamine.

10. The process of claim 7 wherein the nitrogen-containing compound is ammonia.

11. The process of claim 7 wherein the nitrogen-containing compound is urea.

12. The water-soluble thermosettable resinous composition produced by the process of claim 1.

13. An aqueous solution of the composition of claim 12 having a solids content of about 15% to about 25% and a pH of from about 6 to about 7.5.

* * * * *